United States Patent [19]
Pfeiffer

[11] Patent Number: 6,034,801
[45] Date of Patent: Mar. 7, 2000

[54] TRANSMITTING DEVICE, TRANSMITTING APPARATUS AND OPTICAL TRANSMISSION SYSTEM FOR OPTICALLY TRANSMITTING ANALOG ELECTRICAL SIGNALS

[75] Inventor: Thomas Pfeiffer, Stuttgart, Germany

[73] Assignee: Alcatel, Paris, France

[21] Appl. No.: 08/879,425

[22] Filed: Jun. 20, 1997

[30] Foreign Application Priority Data

Jun. 28, 1996 [DE] Germany .............................. 196 26 128

[51] Int. Cl.[7] .................................................. H04J 14/08
[52] U.S. Cl. ......................... 359/136; 359/137; 359/173; 359/186; 359/188
[58] Field of Search ..................................... 359/125, 124, 359/136, 137, 154, 173, 180, 188, 181, 184, 186; 372/6, 18, 26; 455/2; 348/6, 7, 10

[56] References Cited

U.S. PATENT DOCUMENTS

| | | | |
|---|---|---|---|
| 4,300,166 | 11/1981 | Marey | 359/184 X |
| 4,399,564 | 8/1983 | Cowen | 359/184 X |
| 4,506,387 | 3/1985 | Walter | 359/185 X |
| 4,928,316 | 5/1990 | Heritage et al. | 359/154 |
| 5,204,767 | 4/1993 | Nakata et al. | 359/125 |
| 5,381,426 | 1/1995 | Fontana et al. | 372/18 |
| 5,546,414 | 8/1996 | Pfeiffer | 372/18 |

FOREIGN PATENT DOCUMENTS

| | | |
|---|---|---|
| 0632552 | 1/1995 | European Pat. Off. . |
| 0658015 | 6/1995 | European Pat. Off. . |
| 2922418 | 12/1980 | Germany . |
| 3208308 | 9/1983 | Germany . |
| 3242028 | 5/1984 | Germany . |
| 9111173 U | 12/1991 | Germany . |
| 4438942 | 5/1996 | Germany . |
| 4441133 | 5/1996 | Germany . |

OTHER PUBLICATIONS

"Elektronik–Lexikon", W. Baier, Franckh'sche Verlagshandlung, W. Keller & Co., Stuttgart, 1982, pp. 120–121.
"Optische Nachrichtentechnik, Teil II: Komponenten, Systeme, Messtechnik", H. Unger, Huthig Buch Verlag, Heidelberg, 2nd Ed., pp. 448, 449.
"Diamant—Ein digitales optisches Fernsehverteilnetz", H. Zielinski et al, *Telekom Praxis,* Feb. 1993, pp. 38–45.

*Primary Examiner*—Thomas Mullen
*Attorney, Agent, or Firm*—Ware, Fressola, Van Der Sluys & Adolphson LLP

[57] ABSTRACT

An optical transmission system (SYS), e.g. a cable television distribution network, contains at least one transmitting device (SEN), an optical transmission network (NET) and a number of receiving devices (EMP). In order to transmit analog electrical signals, e.g. television signals in the MHz range in such an optical transmission system, the analog electrical signals are first digitized in accordance with the pulse-duration modulation method (PDM) and are then routed to an electro-optic modulator (MOD). An optical pulse source (PULS) generates optical pulses whose repetition frequency rate is higher by the factor of 100 at least than the 3-dB cutoff frequency of the analog electrical signals, e.g. 10 GHz. The optical pulses are modulated with the digitized signals in the electro-optic modulator (MOD) and are then transmitted to the receiving devices (EMP). Only an optical-to-electrical converter OE and a passive electrical low-pass filter (TP) are required to recover the analog electrical signals. The modulated optical pulses from different transmitting devices (SEN) can be transmitted in the optical time-division multiplex method to increase the transmission capacity.

10 Claims, 3 Drawing Sheets

TRANSMITTING DEVICE, TRANSMITTING APPARATUS AND OPTICAL TRANSMISSION SYSTEM FOR OPTICALLY TRANSMITTING ANALOG ELECTRICAL SIGNALS

BACKGROUND OF THE INVENTION

1. Technical Field of the Invention

The invention concerns a transmitting device, a transmitting unit and an optical transmission system for optically transmitting analog electrical signals.

2. Discussion of Related Art

The analog signals are television signals for example. An optical transmission system for optically transmitting television signals is known from the article "Diamond-A digital optical television distribution network" in the publication 'telecom praxis' 2/1993, pages 38 to 45. The television signals have a bandwidth of 7 MHz to 14 MHz. They are usually converted from analog to digital by means of pulse code modulation, then multiplexed electrically and converted electrical-to-optical; one optical pulse usually corresponds to one electrical pulse and thus to one bit. The now optical digital television signals are transmitted to several receiving devices via a passive optical transmission network of glass-fibers, i.e., optical fibers, and optical splitters. Each receiving device includes optical-to-digital converters and a digital-to-analog converter for recovering the analog electrical signals. The number of multiplexed television signals is limited by the resolution and speed of the available digital-to-analog converters. Each digital-to-analog converter is an active unit which must be controlled and synchronized.

SUMMARY OF THE INVENTION

It is therefore a task of the invention to optically transmit analog electrical signals.

According to a first aspect of the invention, a transmitting device for optically transmitting analog electric signals in the form of modulated optical pulses, comprises a device for digitizing the analog electric signals by pulse-duration modulation, an optical pulse source for generating optical pulses whose repetition frequency is higher than the 3-dB cutoff frequency of the analog electric signals by at least a factor of a hundred, and an electro-optic modulator for modulating the optical pulses with the digitized electric signals.

According to a second aspect of the invention, a transmitting unit comprises at least two transmitting devices according to the first aspect of the present invention, and an optical multiplexer for optically time-division multiplexing the modulated optical pulses.

According to a third aspect of the invention, an optical transmission system comprises at least one transmitting device, a passive optical transmission network, and a plurality of receiving devices, each of the receiving devices comprising an optical-to-electrical transducer and a passive electric filter for recovering the analog electric signals from the received modulated optical pulses.

A special advantage of the invention is that it is applicable up to bit rates above 10 GHz. This is achieved, e.g., by using a mode-locked fiber ring laser as the optical pulse source.

A further advantage of the invention is the reduction in the accuracy requirements regarding the linearity of the electro-optic modulator by using a fixed pulse repetition frequency. A fixed pulse repetition frequency allows the transmission of a number of analog electrical signals with different bandwidths.

In addition the transmission capacity can be increased by optically time-division multiplexing modulated optical pulses from different transmission devices. It is furthermore advantageous if the receiving devices only contain passive components. The receiving devices are therefore cheaper, more insensitive to interference and have a simpler circuitry.

BRIEF DESCRIPTION OF THE DRAWING

The invention is explained in the following by means of two configuration examples with the help of FIGS. 1 to 3, where.

DETAILED DESCRIPTION OF THE PREFERRED EMBODIMENTS

Figure 1:
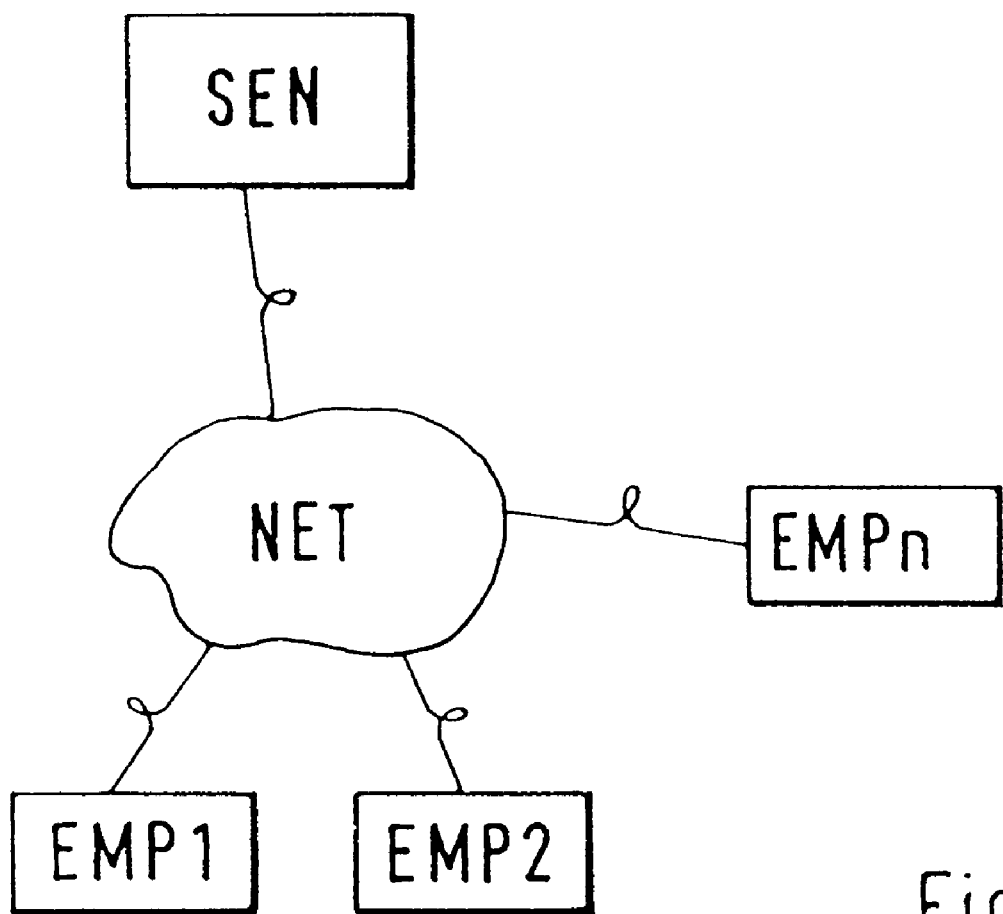
FIG. 1 is a schematic illustration of a transmission system according to the invention.

The first configuration example will now be explained with the help of FIGS. 1 and 2. FIG. 1 illustrates an optical transmission system SYS according to the invention for the optical transmission of analog electrical signals. The optical transmission system SYS contains a transmitting device SEN which is connected to several receiving devices EMP1, EMP2, . . . , EMPn via a passive optical transmission system NET; n is a natural number.

The analog electrical signals are television signals for example. For the optical transmission, the analog electrical signals are first converted from analog to digital in the transmitting device. This takes place by modulating the analog electrical signals in accordance with the pulse-duration modulation method. Subsequently the digitized electrical signals are converted from electrical to optical. The conversion takes place with an optical pulse source and an electrical-to-optical modulator. In this way the transmitting device is used for the analog-to-digital and the electrical-to-optical conversion of the analog electrical signals. From the transmitting device the analog electrical signals are fed in the form of modulated optical pulses to the passive optical transmission network NET.

The passive optical transmission network NET is an optical cable television distribution network with optical fiber cables and optical splitters for example. The cable television distribution network provides a point-to-multiple point connection between the transmitting device SEN and the receiving devices EMP1, EMP2, . . . , EMPn. In this way the modulated optical pulses sent out by the transmitting device SEN reach all the receiving devices EMP1, EMP2, . . . , EMPn. The analog electrical signals can be television signals as well as video signals for transmission in a video-on-demand system. In the latter case the passive optical transmission network NET is preferably a distribution network with a feedback channel.

The analog electrical signals are recovered from the respective received modulated optical pulse by the receiving devices EMP1, EMP2, . . . , EMPn. The recovery is accomplished with an optical-to-electrical converter and a passive electrical low-pass filter.

The optical transmission system SYS provides a method of optically transmitting analog electrical signals which is independent of the optical transmission network NET structure, and where the recovery of the analog electrical signals only requires a passive lowpass filter. With a transmitting device SEN and a number of receiving devices EMP1, EMP2, ..., EMPn, for example 1000, this is an advantage for the circuitry as well as for reasons of cost.

The analog electrical signals have a bandwidth of 10 MHz for example. They are converted by the transmitting device into optical pulses with a repetition frequency rate of 10 Gbits for example. This oversampling results in the transmission being insensitive to interference.

Figure 2:
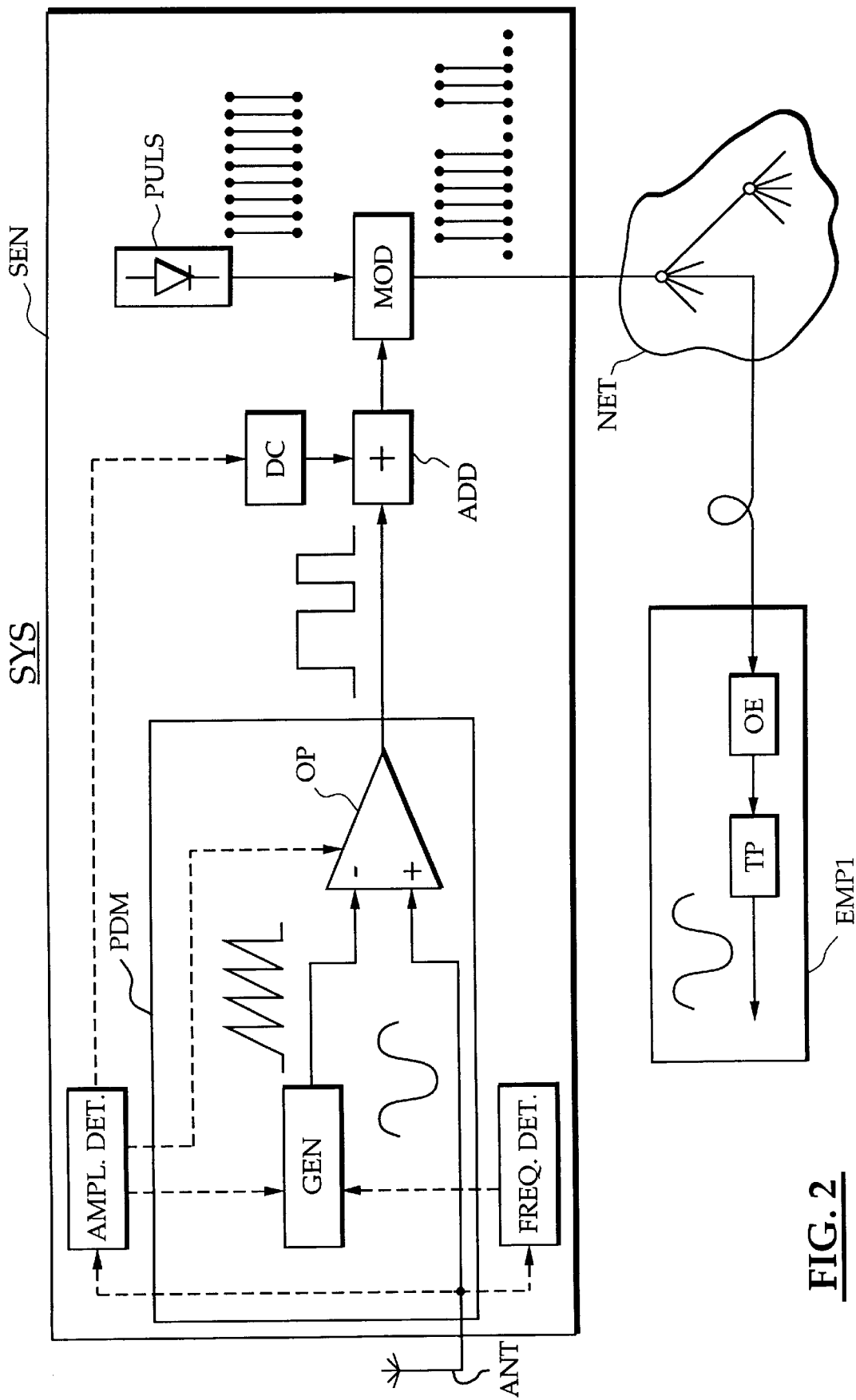
FIG. 2 is the schematically illustrated construction of a transmitting device and a receiving device of the transmission system in FIG. 1.

FIG. 2 illustrates the construction of a transmitting device SEN according to the invention and a receiving device EMP1 according to the invention for the optical transmission system in FIG. 1.

The transmitting device SEN and the receiving device EMP1 are interconnected by an optical distribution network NET composed of optical splitters and optical fiber lines.

The transmitting device SEN receives analog electrical signals via an antenna ANT. The received signals are television signals transmitted by a television station for example. They are routed to a PDM device which is used for digitization in accordance with the pulse-duration modulation method. The received signals for example have a 3-dB cutoff frequency of 10 MHz and therefore a bandwidth of 10 MHz. The PDM device contains a signal generator GEN and a comparator OP.

The signal generator GEN generates sampling signals which have a sawtooth or a triangular shape for example. The frequency of the sampling signals is at least twice as high as the 3-dB cutoff frequencies of the received analog signals, therefore 20 MHz for example. The amplitude of the sampling signals is at least equal to the amplitude of the received signals.

The comparator OP is configured for example as an amplifier OP with a differential input which functions as a comparator. The received analog signals are routed to the positive input of amplifier OP and the generated sampling signals to the negative input of amplifier OP. When the analog electrical signals are compared with the sampling signals, each coincidence of the input voltages at the output of amplifier OP causes a change in the sign of the output voltage which produces pulse-duration modulated signals. The signals that are digitized in this manner are routed to the electrical input of an electro-optic modulator MOD. An adder ADD for adding d.c. voltage signals to the digitized signals is connected between the PDM device and the electro-optic modulator MOD.

The d.c. voltage signals are generated by a d.c. voltage source DC. They are used to adapt the d.c. voltage level of the digitized signals to the modulation range of the electro-optic modulator MOD.

The transmitting device SEN furthermore contains an optical pulse source PULS for generating optical pulses whose repetition frequency rate is much higher, preferably by a factor of at least 100 times higher than the 3-dB cutoff frequency of the analog electrical signals, for example 10 GHz. A mode-locked fiber ring laser is preferably used to generate such 10 GHz signals, whose amplifying element is doped with an element from the group of rare earths, preferably erbium. The generated optical pulses are routed to the optical input of the electro-optic modulator MOD.

The electro-optic modulator MOD is a Mach-Zehnder modulator for example, whereby an intensity modulation can be performed. It is used to modulate the optical pulses with the digitized electrical signals. The 10 GHz optical pulses are therefore modulated with the digitized 20 MHz signals. A high resolution is achieved in the modulation of the digitized signals because of the large frequency difference of, e.g., preferably at least two orders of magnitude between optical pulses and digitized signals, which causes any distortion of the analog electrical signals that are recovered by the receiving device EMP1 to be very small. The modulated optical signals are transmitted by the optical distribution network NET to several receiving devices EMP1, EMP2, ..., EMPn, only one of which is illustrated in FIG. 2.

The receiving device EMP1 contains an optical-to-electrical converter OE which is followed by a passive electrical low-pass filter TP for the recovery of the analog electrical signals from the received modulated optical signals.

The optical-to-electrical converter converts the optical signals into electrical signals by means of a photodiode. The sensitivity of the photodiode is at least twice the 3-dB cutoff frequency of the analog electrical signals, for example 20 MHz, enabling the envelope of the received optical signals to be detected and converted into electrical signals.

The passive electrical low-pass filter TP is a 5th or a 7th order low-pass filter for example, constructed of a chain circuit of resistors and capacitors and with a cutoff frequency that corresponds to the 3-dB cutoff frequency of the analog electrical signals, for example 10 MHz. The analog electrical signals are recovered from the output signals of the optical-to-electrical converter OE by means of the passive electrical low-pass filter TP. No active units are therefore required to recover the analog electrical signals.

Figure 3:
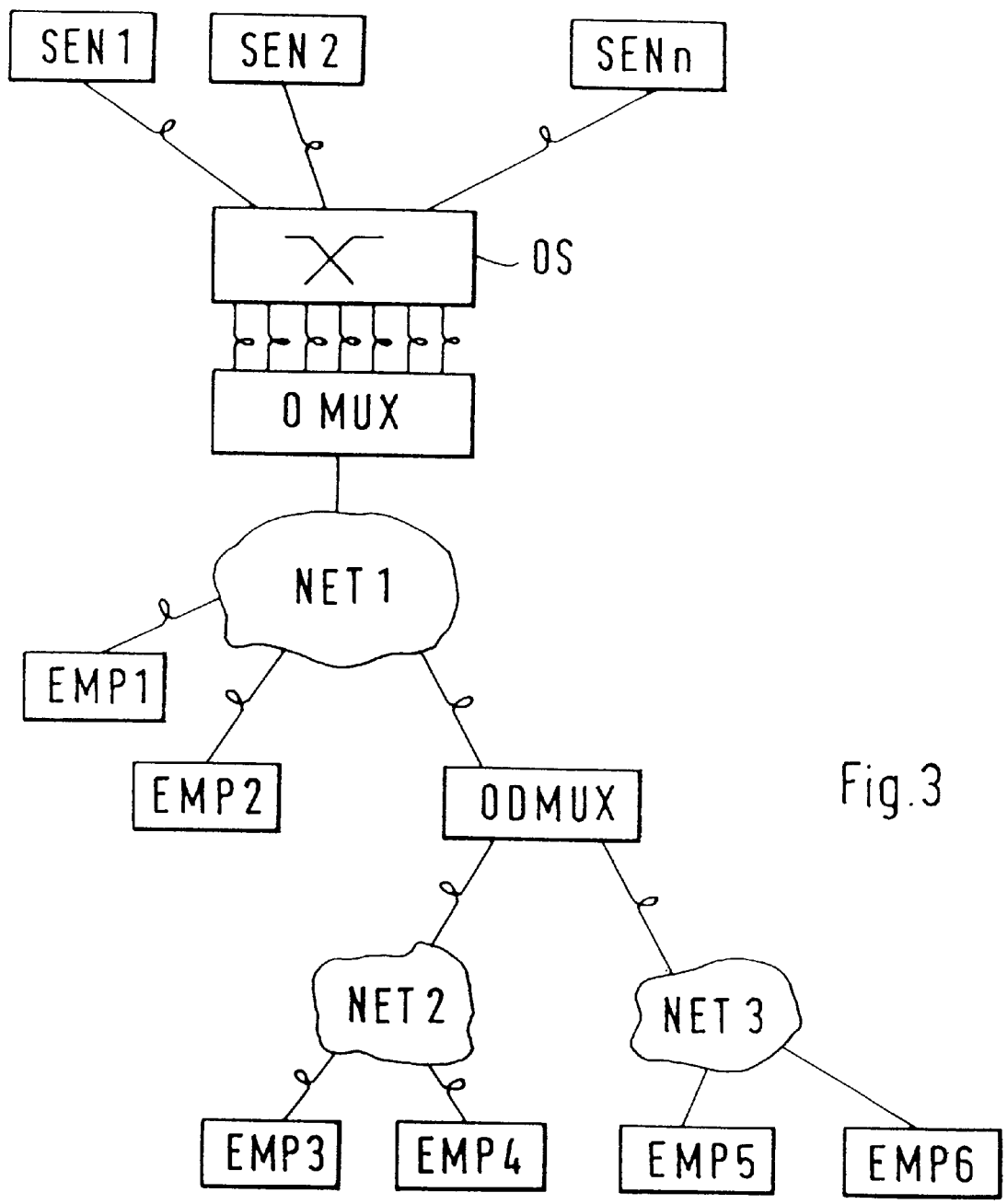
FIG. 3 is a schematic illustration of a second configuration example of a transmission system according to the invention.

The second configuration example will now be described with the help of FIG. 3. FIG. 3 illustrates an optical transmission system SYS according to the invention, with several transmitting devices SEN1, SEN2, ..., SENn and several receiving devices EMP1 to EMP6, six of which are illustrated as an example. The optical transmission system SYS is used to transmit modulated optical pulses from individual transmitting devices SEN1 to SENn to individual receiving devices EMP1 to EMP6, or to groups of receiving devices EMP1, EMP2, EMP3, EMP4, EMP5, EMP6. The transmission takes place in the optical time-division multiplex method. Since not all transmitting devices SEN1 to SENn are active at the same time, an optical switching unit OS is provided and performs the switching functions for the optimum usage of the transmission capacity of the optical fiber lines.

Each of the transmitting devices SEN1 to SENn corresponds to the transmitting device SEN in FIG. 2 with respect to construction and functionality.

The number n of transmitting devices SEN1 to SENn is 100 for example. Each transmitting device SEN1 to SENn is connected to the optical switching unit OS via an optical fiber line.

The task of the optical switching unit OS is to detect the active transmitting devices SEN1 to SENn and to forward their signals to an optical multiplexer OMUX. Assuming that only 6 of the 100 transmitting devices SEN1 to SENn are active simultaneously, 6 optical fiber lines are sufficient to transmit all modulated optical pulses from the switching unit OS to the optical multiplexer OMUX. For each transmitting device SEN1 to SENn the optical switching unit OS for example contains an asymmetric coupler, an electro-optic modulator, a timing recovery unit and a photodiode. The optical switching unit OS furthermore contains a central electrical controller and 6 electro-optic modulators for the 6 optical fiber lines which are connected to the optical multiplexer OMUX. Part of the modulated optical pulses of an active transmitting device SEN1 to SENn are coupled out and routed to the central electrical controller via the optical timing recovery unit and the photodiode. The central controller then controls two electro-optic modulators in a way so that the modulated optical signals are routed to the optical multiplexer OMUX through a still unoccupied optical fiber line. The optical switching unit OS is a so-called optical cross-connect for example, whereby every input can be switched to every output; an optical fiber line may be required for the control signals.

The optical multiplexer OMUX bundles the modulated optical signals from the 6 optical fiber lines so that they can be transmitted in one optical fiber line. Each of the modulated optical signals has a bit rate of 10 Gbit/s. The 6 modulated optical signals are combined into a 60 Gbits signal in the time-division multiplex method and fed to an optical transmission network NET1 through an optical fiber line.

The optical transmission network NET1 is a cable television distribution network of optical fiber lines and optical splitters for example, or a submarine cable. The structure of the optical transmission network NET1 is for example tree-shaped, bus-shaped or star-shaped. The optical transmission network NET1 is connected for example to several receiving devices EMP1, EMP2, two of which are illustrated, and to an optical demultiplexer ODMUX.

Each receiving device contains an optical demultiplexer ODMUX and six optical-to-electrical converters and six passive electrical low-pass filters for the recovery of the analog electrical signals.

The optical demultiplexer ODMUX is used to split the combined modulated optical signals into different transmission networks NET2, NET3.

The optical transmission network NET2 is, for example, a cable television distribution network which routes the television signals from a television station, for example the transmitting device SEN1, to several receiving devices EMP3, EMP4, two of which are illustrated as an example. The receiving device EMP3 can also be a coaxial cable network interface for example.

The optical transmission network NET3 is a submarine cable for example, whereby video signals, e.g. the latest movie films, are routed to individual movie installations, for example the receiving devices EMP5 and EMP6.

In the first configuration example, the analog electrical signals received via the antenna ANT are routed directly to the PDM device for digitization of the analog electrical signals. Since the amplitude of the sampling signals must be adapted to the amplitude of the analog signals it can lead to errors in the modulation. This can be avoided in the following manner:

An amplitude detector is added to the transmitting device SEN to detect the amplitude of the received analog electrical signals and to generate control signals for adjusting the amplitude of the output signals from the signal generator GEN, the comparator OP and/or the d.c. voltage source DC. In this way the amplitude of the received analog electrical signals is measured and the amplitude of the sampling signals is adapted to this amplitude. This could possibly require a readjustment of the amplitude of the output signals from the amplifier and from the d.c. voltage source.

Both configuration examples are able to utilize a specified and not variable pulse frequency rate of optical pulses from the optical pulse source, e.g. 10 Gbits, for digitizing a number of analog electrical signals with different bandwidths, e.g. 1 MHz to 100 MHz. This can take place for example with a signal generator GEN whose sampling frequency is adjustable, and a frequency detector for detecting the 3-dB cutoff frequency of the received analog signals and for generating the adjustment signals for the signal generator in the transmitting device SEN of FIG. 2. The measured 3-dB cutoff frequency provides the value for adjusting the sampling frequency, which must be higher than the 3-dB cutoff frequency by a factor of 2 at least.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Transmitting device (SEN) for optically transmitting analog electric signals in the form of modulated optical pulses, comprising:
   a device (PDM) for digitizing the analog electric signals by pulse-duration modulation;
   an optical pulse source (PULS) for generating optical pulses whose repetition frequency is higher than the 3-dB cutoff frequency of the analog electric signals by at least a factor of 100; and
   an electro-optic modulator (MOD) for modulating the optical pulses with the digitized electric signals.

2. A transmitting device (SEN) as claimed in claim 1, characterized in that the analog electric signals are television signals, and that the transmitting device (SEN) serves to feed the modulated optical pulses into a cable television distribution network (NET).

3. A transmitting device (SEN) as claimed in claim 1, characterized in that the optical pulse source (PULS) comprises a mode-locked fiber ring laser, and that the device (PDM) for modulating the analog electric signals comprises a signal generator (GEN) for generating sampling signals and a comparing unit (OP) for comparing the analog electric signals with the sampling signals.

4. A transmitting device (SEN) as claimed in claim 3, characterized in that it comprises an amplitude detector for detecting the amplitude of the analog electric signals and for generating control signals for adjusting the amplitude of the output signals of the signal generator (GEN), the comparing unit (OP), or both.

5. A transmitting device (SEN) as claimed in claim 3, characterized in that the frequency of the sampling signals of the signal generator is adjustable, and that the transmitting device (SEN) comprises a frequency detector for detecting the 3-dB cutoff frequency of the analog electric signals and for generating signals for adjusting the sampling signal frequency.

6. A transmitting device (SEN) as claimed in claim 1, characterized in that it comprises a DC voltage source (DC) for generating DC voltage signals and for adapting the DC voltage level of the digitized signals to the dynamic range of the electro-optic modulator (MOD).

7. A transmitting device (SEN) as claimed in claim 6, characterized in that it comprises an amplitude detector for detecting the amplitude of the analog electric signals and for generating control signals for adjusting the amplitude of the output signals of the DC voltage source (DC).

8. Optical transmission system (SYS) comprising at least one transmitting device (SEN) as claimed in claim 1, a passive optical transmission network (NET), and a plurality of receiving devices (EMP), each of the receiving devices (EMP) comprising an optical-to-electrical transducer (OE)

and a passive electric filter (TP) for recovering the analog electric signals from the received modulated optical pulses.

9. Transmitting apparatus comprising at least two transmitting devices (SEN) for optically transmitting analog electric signals in the form of modulated optical pulses, each device comprising:

a device (PDM) for digitizing the analog electric signals by pulse-duration modulation;

an optical pulse source (PULS) for generating optical pulses whose repetition frequency is higher than the 3-dB cutoff frequency of the analoa electric signals by at least a factor of 100; and an electro-optic modulator (MOD) for modulating the optical pulses with the digitized electric signals;

said apparatus further comprising:

an optical multiplexer (OMUX) for optically time-division multiplexing the modulated optical pulses.

10. A transmitting apparatus as claimed in claim 9, characterized in that it further comprises an optical switching unit (OS) which is connected between the at least two transmitting devices (SEN) and the optical multiplexer (OMUX), and by means of which a switching function can be performed.

* * * * *

UNITED STATES PATENT AND TRADEMARK OFFICE
CERTIFICATE OF CORRECTION

PATENT NO : 6,034,801
DATED : March 7, 2000
INVENTOR(S): T. Pfeiffer

It is certified that error appears in the above-identified patent and that said Letters Patent are hereby corrected as shown below:

At col. 7, line 11, please change "analoa" to --analog--.

Signed and Sealed this

Third Day of April, 2001

Attest:

NICHOLAS P. GODICI

*Attesting Officer*   *Acting Director of the United States Patent and Trademark Office*